ты

(12) United States Patent
Toyoshima et al.

(10) Patent No.: US 7,129,322 B2
(45) Date of Patent: Oct. 31, 2006

(54) METHOD FOR PRODUCING POLYMER ALLOY POLYMER ALLOY FORMED ARTICLE TRANSPARENT FORMED ARTICLE AND OPTICAL FILM

(75) Inventors: Katsunori Toyoshima, Mishima-gun (JP); Takeharu Morita, Mishima-gun (JP); Toshio Tada, Mishima-gun (JP); Youhei Nishimura, Mishima-gun (JP)

(73) Assignee: Seikisui Chemicals Co., Ltd., Osaka (JP)

( * ) Notice: Subject to any disclaimer, the term of this patent is extended or adjusted under 35 U.S.C. 154(b) by 0 days.

(21) Appl. No.: 10/493,395

(22) PCT Filed: Oct. 23, 2002

(86) PCT No.: PCT/JP02/10978

§ 371 (c)(1),
(2), (4) Date: Jul. 26, 2004

(87) PCT Pub. No.: WO03/035725

PCT Pub. Date: May 1, 2003

(65) Prior Publication Data

US 2005/0020806 A1    Jan. 27, 2005

(30) Foreign Application Priority Data

Oct. 24, 2001 (JP) ............................. 2001-326499
Dec. 27, 2001 (JP) ............................. 2001-395985
Apr. 16, 2002 (JP) ............................. 2002-113506

(51) Int. Cl.
*C08F 6/00* (2006.01)

(52) U.S. Cl. .................. 528/480; 264/176.1; 264/219; 359/642; 528/481; 528/482; 528/483; 528/484; 528/486

(58) Field of Classification Search ............. 264/176.1, 264/219; 359/642; 528/480, 481, 482, 483; 424/484, 486
See application file for complete search history.

(56) References Cited

U.S. PATENT DOCUMENTS

| 5,106,906 A | 4/1992 | Meier et al. |
| 5,295,745 A * | 3/1994 | Cassettari et al. ............ 374/10 |
| 6,521,258 B1 * | 2/2003 | Mandel et al. .............. 424/484 |

FOREIGN PATENT DOCUMENTS

| DE | 3833218 A1 | 4/1990 |
| JP | 8-503721 A | 4/1996 |
| JP | 10-330493 A | 12/1998 |
| JP | 2001-310947 A | 11/2001 |
| JP | 2002-322288 A | 11/2002 |
| JP | 06-234861 A | 8/2004 |

* cited by examiner

*Primary Examiner*—Terressa Boykin
(74) *Attorney, Agent, or Firm*—Sughrue Mion, PLLC

(57) ABSTRACT

This invention provides a method for producing a polymer alloy, a polymer alloy as well as a molded article, a transparent molded article and an optical film, which is obtainable by using the polymer alloy.

Figure 1:
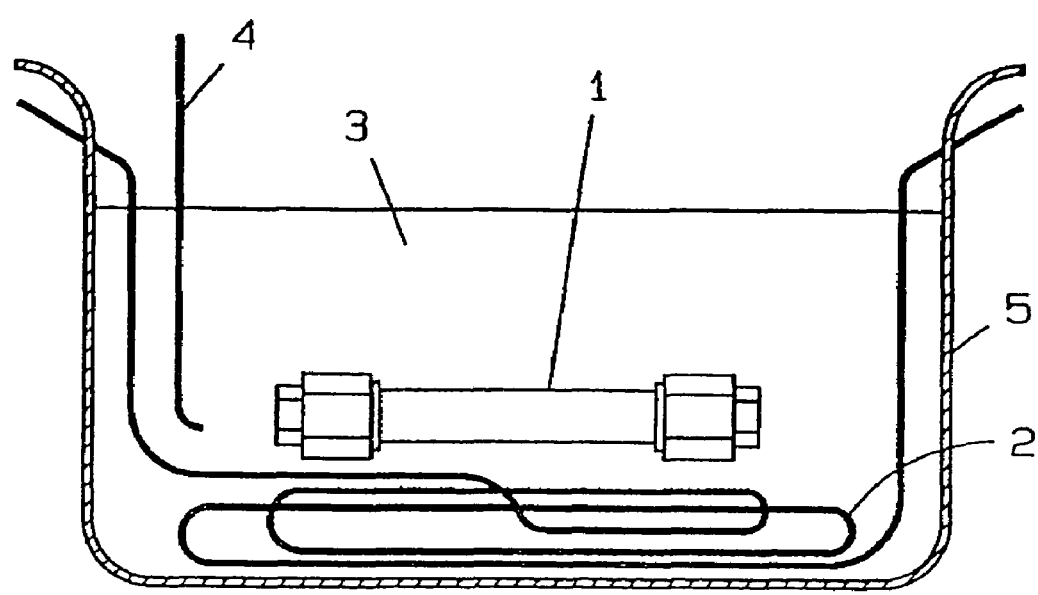

The invention is a method for producing a polymer alloy, which comprises at least: a step 1 of mixing two or more resins incompatible with each other at ambient temperature and pressure with a solvent being in a liquid or gas state at ambient temperature and pressure; a step 2 of heating and applying pressure to said solvent into a high-temperature and high-pressure fluid or a supercritical fluid and mixing the solvent in this state; and, a step 3 of cooling the mixture obtained in said step 2 rapidly to the glass transition temperature or less without releasing the pressure of the mixture.

20 Claims, 2 Drawing Sheets

METHOD FOR PRODUCING POLYMER ALLOY POLYMER ALLOY FORMED ARTICLE TRANSPARENT FORMED ARTICLE AND OPTICAL FILM

TECHNICAL FIELD

The present invention relates to a method for producing a polymer alloy, a polymer alloy as well as a molded article, a transparent molded article and an optical film which is obtainable by using the polymer alloy.

BACKGROUND ART

Public attention is focused on polymer alloys having the characteristics which are not obtained by a single polymer but obtained by blending two or more polymers which are incompatible with each other in a usual state. Especially, in the case where two or more polymers form a ultra-micro-phase separation structure, a polymer alloy on which the characteristics of each resin are reflected can be obtained. For example, an amorphous polymer having high heat resistance is added to an amorphous polymer which has good moldability but low heat resistance to form a polymer alloy, whereby a polymer alloy having good moldability and high heat resistance can be manufactured. In addition, unlike copolymers such as block copolymers or random copolymers, troublesome copolymerizing operations are not required in the production of the polymer alloy.

Conventionally, a kneading method is used as a method for producing a polymer alloy having a ultra-micro-phase separation structure by blending two or more polymers which are incompatible with each other in a usual state. In order to obtain a satisfactory ultra-micro-phase separation structure, it has been regarded as essential to use some compatibilizing agent. As the compatibilizing agent, one corresponding to a raw polymer must be selected. However, this selection is not easy, it is difficult to obtain a polymer alloy forming a ultra-micro-phase separation structure and having desired characteristics and, also, there are combinations of polymers for which good compatibilizing agent has not been found so far.

Meanwhile, in Japanese Kokai Publication Hei-2-134214, a method is disclosed in which two types of polymers are melted using supercritical gas which is present in a gas state at ambient temperature and pressure or a mixture of supercritical gas, these components are thoroughly mixed for a plenty of time until the viscosity of the polymer mixture is decreased by at least 10%, then the melt mixture is cooled sufficiently, taking much time to continue mixing until the viscosity of the melt mixture of the polymers reaches again at least the original value and then the pressure in the mixing container is rapidly released to produce a polymer alloy micro-dispersion phase separation structure. Also, in Japanese Kokai Publication Hei-10-330493, a method is disclosed in which a solvent which is a liquid state at ambient temperature and pressure is changed to a high temperature and high pressure fluid to make incompatible two or more polymers compatible with each other and then the pressure in the system is rapidly dropped to vaporize the solvent, thereby producing a polymer alloy having a ultra-micro-phase separation structure 100 nm or less in size.

However, these methods of producing a polymer alloy involve a cooling process using the so-called adiabatic expansion in which process the pressure of supercritical gas or a mixture containing supercritical gas is suddenly released or is dropped suddenly from the pressure condition to thereby vaporize the high pressure and high temperature fluid during the course of the process; therefore, a large number of air bubbles are generated in the resulting polymer alloy. A troublesome defoaming process is required to obtain a transparent molded article by using such a polymer alloy having air bubbles and, also, there is the case where the ultra-micro-phase separation structure of the polymer alloy is broken by the defoaming process, which considerably limits the range of the applications of these methods. There is also the problem that it is hard to scale up the process of vaporizing a solvent suddenly; therefore, the industrialization of the process is difficult.

A method for producing a polymer alloy is disclosed in Japanese Kokai Publication Hei-6-234861, the method using at least one block copolymer or graft copolymer in a supercritical fluid. However, in this method, a pressured polymer alloy is expanded by passing it through a fine nozzle; therefore, foaming is easily caused, giving rise to the problem that a process of removing air bubbles is inevitable. Also in this method, after glass beads to which a raw resin is stuck are packed in a column, the supercritical fluid is flown through the column to mix the resin with dissolving the resin; therefore, the ratio of a composition is determined by the solubility ratio of each resin. Further, because the amount of a resin which can be treated is small and a raw resin cannot be supplied continuously, resulting in small throughput.

SUMMARY OF THE INVENTION

It is an object of the present invention to provide a method for producing a polymer alloy, a polymer alloy as well as a molded article, a transparent molded article and an optical film which is obtainable by using the polymer alloy.

A first aspect of the present invention is directed to a method for producing a polymer alloy, which comprises at least: a step 1 of mixing two or more resins incompatible with each other at ambient temperature and pressure with a solvent being in a liquid or gas state at ambient temperature and pressure; a step 2 of heating and applying pressure to said solvent into a high-temperature and high-pressure fluid or a supercritical fluid and mixing the solvent in this state; and, a step 3 of cooling the mixture obtained in said step 2 rapidly to the glass transition temperature or less without releasing the pressure of the mixture. The volume of the solvent in the mixture of the two or more resins incompatible with each other at ambient temperature and pressure and the solvent being in a liquid state at ambient temperature and pressure is preferably equal to or more than the total volume of said two or more resins incompatible with each other at ambient temperature and pressure. The two or more resins incompatible with each other at ambient temperature and pressure are preferably a thermoplastic norbornene resin and one or more resins incompatible with the thermoplastic norbornene resin.

A second aspect of the present invention is directed to a polymer alloy being obtainable by mixing two or more resins incompatible with each other at ambient temperature and pressure in a high-temperature and high-pressure fluid or a supercritical fluid, wherein, at least, when a phase transition phenomenon is observed by using a differential calorimeter, the phase transition phenomenon of any resin among said two or more resins disappears or a phase transition phenomenon is observed at a temperature differing from the temperatures occurring the phase transition phenomenon of each resin. With regard to the polymer alloy according to the second aspect of the present invention, when the highest and lowest temperatures among the glass transition temperatures of two or more resins incompatible with each other at ambient temperature and pressure are $Tg_H$ and $Tg_L$, respectively, and an absolute difference between $Tg_H$ and $Tg_L$ is α, a glass transition temperature Tg of the polymer alloy is preferably in the range of Tg'±0.1α for Tg' calculated by the following equation (1):

$$\Sigma(w_i/Tg_i)=1/Tg' \qquad (1)$$

in the formula, $w_i$ represents the weight percentage of a resin i and $Tg_i$ represents the glass transition temperature of a resin i.

With regard to the polymer alloy according to the second aspect of the present invention, when the highest and lowest temperatures among the glass transition temperatures of two or more resins incompatible with each other at ambient temperature and pressure are $Tg_H$ and $Tg_L$, respectively, and an absolute difference between $Tg_H$ and $Tg_L$ is α, a variation in the glass transition temperature of the polymer alloy is preferably within 0.3α in the case of processing the polymer alloy in a heat cycle including the requirement for the condition heated to at least its glass transition temperature or more.

With regard to the polymer alloy according to the second aspect of the present invention, said polymer alloy preferably comprises a transparent resin and at least one or more resins incompatible with the transparent resin and, said transparent resin and the resins incompatible with the transparent resin preferably form a ultra-micro-phase separation structure 100 nm or less in size.

A molded article which is obtainable by molding the polymer alloy according to the second aspect of the present invention and a transparent molded article which is obtainable by melt-molding the polymer alloy according to the second aspect of the present invention are also respectively one of the present invention. With regard to a method for producing the molded article or transparent molded article, the polymer alloy is preferably molded at a temperature higher than the phase transition initiation temperature of the ultra-micro-phase separation structure of the polymer alloy found by a difference calorimeter.

An optical film which is obtainable by using the polymer alloy according to the present invention is also one of the present invention.

BRIEF DESCRIPTION OF THE DRAWING(S)

Figure 2:
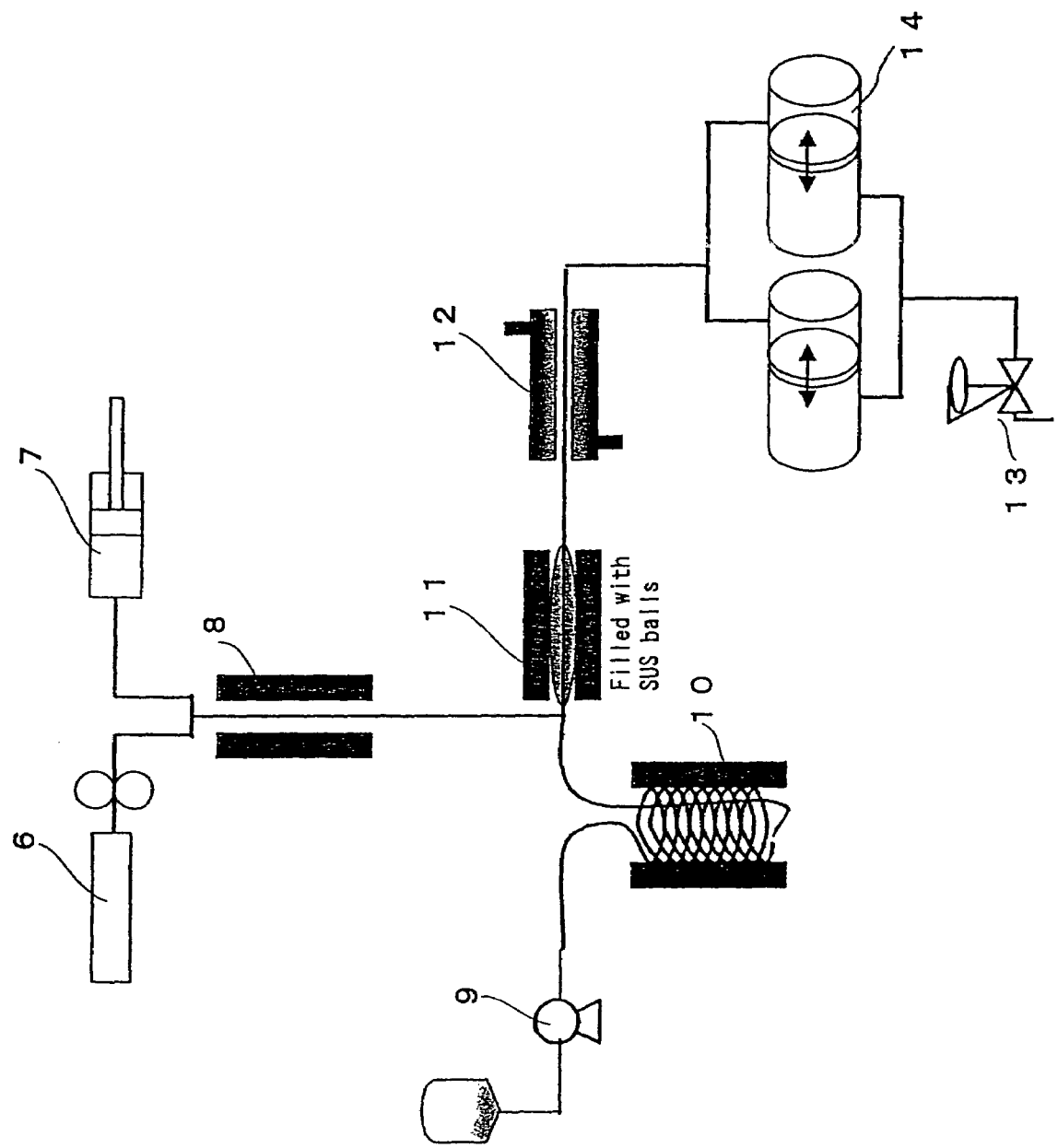

FIG. 1 is a schematic view showing one example of a production apparatus for producing a polymer alloy according to the present invention, and FIG. 2 is a schematic view showing one example of a production apparatus for producing a polymer alloy according to the present invention.

In these figures, 1 represents a production container, 2 represents a heater, 3 represents a metal salt, 4 represents a thermocouple, 5 represents a metal salt molten bath, 6 represents an extruder, 7 represents a syringe feeder, 8 represents a sheath heater, 9 represents a quantitative pump, 10 represents a metal salt molten bath, 11 represents an electric furnace, 12 represents a cooing machine, 13 represents a back pressure regulating valve and 14 represents a recovery tank.

DETAILED DISCLOSURE OF THE INVENTION

The present invention will be hereinafter described in detail.

A method for producing a polymer alloy according to a first aspect of the present invention comprises at least a step 1 of mixing two or more resins incompatible with each other at ambient temperature and pressure with a solvent being in a liquid or gas state at ambient temperature and pressure; a step 2 of heating and applying pressure to said solvent into a high-temperature and high-pressure fluid or a supercritical fluid and mixing the solvent in this state; and, a step 3 of cooling the mixture obtained in said step 2 rapidly to the glass transition temperature or less without releasing the pressure of the mixture. In this specification, the polymer alloy means a mixture of resins having a phase separation structure in which each resin is uniformly dispersed as a small resin domain in a mixed state and, preferably, means a mixture of resins having a ultra-micro-phase separation structure in which each resin domain has a size of 100 nm or less. Also in this specification, the polymer alloy may have the state that the above-mentioned resin domains are very small to the extent that resins are mutually dissolved completely.

In the method for producing a polymer alloy in the first aspect of the present invention, at first, two or more resins incompatible with each other at ambient temperature and pressure are mixed with a solvent which is a liquid state or in a gas state at ambient temperature and pressure in the step 1.

Examples of the solvent which is a liquid state at ambient temperature and pressure include water, organic solvents and the like. Examples of the organic solvent include hydrocarbon type organic solvents such as hexane, heptane, cyclohexane and toluene; ether type organic solvents such as diethyl ether, dibutyl ether, tetrahydrofuran and dioxane; ester type organic solvents such as ethyl acetate and butyl acetate; ketone type organic solvents such as acetone, methyl ethyl ketone and methyl isobutyl ketone; alcohol type organic solvents such as methanol, ethanol and isopropyl alcohol; and dimethylsulfoxide and N,N-dimethylformamide.

Examples of the solvent which is in a gas state at ambient temperature and pressure include $N_2$; $CO_2$; $N_2O$; chlorofluorocarbon such as chlorodifluoromethane and dichlorotrifluoroethane or hydrofluorocarbon; low-molecular alkanes such as n-butane, propane and ethane; low-molecular alkenes such as ethylene; and ammonia.

In particular, solvents which are liquid at an ambient temperature (25° C.) at ambient pressure (0.1 MPa) and have critical temperature and critical pressure are preferable. If the solvent is in a gas state at ambient temperature and pressure, pressure must be gradually released under control to prevent the solvent from being foamed. On the other hand, if the solvent is in a liquid state at ambient temperature and pressure, the internal pressure in a mixing container is not changed when pressure is released and there is therefore no possibility of foaming. These solvents may be used either singly or in combinations of two or more.

Particularly in the case of containing a thermoplastic norbornene resin as one of the two or more resins incompatible with each other, water is preferably used as the solvent. Even a thermoplastic norbornene resin which is only soluble in cyclohexane at ambient temperature and pressure in practical use can be dissolved sufficiently in water made to be a high-temperature and high-pressure fluid or a supercritical fluid reduced in polarity. Because the thermoplastic norbornene resin is insoluble in water at ambient temperature and pressure, it is taken out with ease and is therefore easily handled. It is also preferable to use an alcohol as the solvent. Because alcohols are also put in a high-temperature and high-pressure state or supercritical state at relatively low temperatures, the resins are not thermally decomposed and are therefore preferably used.

The above-mentioned solvent preferably occupies a volume to the extent that the resins can be stirred. Specifically, the volume of the solvent put in a liquid state at ambient temperature and pressure is preferably equal to or more than the total volume of the above-mentioned two or more resins incompatible with each other at ambient temperature and pressure.

The viscosity of the solvent put in a high-temperature and high-pressure state or in a supercritical state is high and can be made to be higher than that of the resin. Therefore, even a resin which has a high viscosity and is mixed with difficulty can be mixed with other resins by stirring using the solvent made to have a high viscosity in a high-temperature and high-pressure state or in a supercritical state.

It is to be noted that a compatibilizing agent may be added to the above-mentioned solvent according to the need. Examples of the compatibilizing agent include oligomers or polymers in which segments respectively soluble in each component are present. When the compatibilizing agent is a polymer, it may be any of a random polymer, block polymer and graft polymer.

Also, a polymer can be made to have a function as the compatibilizing agent by modifying a part of the structure of the polymer according to the need. Examples of the compatibilizing agent include maleic acid modified poly(propylene), carboxylic acid modified poly(propylene), amino group-terminal nitrile-butadiene rubber, carboxylic acid modified poly(ethylene), chlorinated poly(ethylene), sulfonated poly(styrene), hydroxyl group-terminal polyolefin, hydroxyl group-terminal poly(butadiene), maleic acid modified ethylene-butylene rubber and poly(ethylene-co-acrylic acid). Also, examples of polymers effective as a compatibilizing agent for graft type polymers include polyolefins with a vinyl polymer grafted to the side chain, poly(carbonate) with a vinyl polymer grafted to the side chain, and the like. Examples of commercially available compatibility promoter include "Modiper" (manufactured by NOF Corporation), "Admer" (manufactured by Mitsui Chemicals Inc.) and the like.

In the method for producing a polymer alloy according to the first aspect of the present invention, next, a step 2 of heating and pressurizing the above-mentioned solvent to make the solvent into a high-temperature and high-pressure fluid or a supercritical fluid and mixing the solvent in this state is carried out.

The temperature of the high-temperature and high-pressure fluid or supercritical fluid is preferably 100 to 700° C. When the temperature is less than 100° C., there is the case where the ultra-micro-phase separation structure of the resulting polymer alloy is insufficiently formed. When the temperature is more than 700° C., there is the case where the resin is decomposed, the energy required for raising temperature is very large and large energy loss is caused, increasing the cost which is uneconomical. The temperature is more preferably 100 to 400° C.

The pressure of the above-mentioned high-temperature and high-pressure fluid or supercritical fluid is preferably 0.5 to 100 MPa. When the pressure is less than 0.5 MPa, the ultra-micro-phase separation structure of the resulting polymer alloy is insufficiently formed. When the pressure is more than 100 MPa, there is the case where the energy required for raising pressure is very large, increasing the cost which is uneconomical. The pressure is more preferably 0.5 to 60 MPa.

The process time required for mixing the resins in a high-temperature and high-pressure state or in a supercritical state is preferably shorter. If the mixing time is short, the decomposition of the resin can be suppressed. When the mixing time is long, there is the case where the resulting resin is decomposed into a liquid. The mixing time is, though it differs depending on process temperature, within preferably 30 minutes, more preferably 20 minutes, still more preferably 10 minutes at 400° C. or more and within preferably one hour, more preferably 30 minutes at 400° C. or less.

Examples of a method enabling the mixing to be completed in a short time like this include a method in which each resin is melted and mixed in advance. Namely, if each resin is melted and mixed in advance, it is rapidly made into a polymer alloy by putting each resin in a high-temperature and high-pressure state or in a supercritical state. This makes it possible to be free from a possibility that a polymer alloy having a composition different from a raw material composition is obtained but makes it possible to obtain a polymer alloy having almost the same composition as the raw material composition.

Also, the time required to reach a high-temperature and high-pressure state or a supercritical state is preferably short. If the time is short, the decomposition of the resin can be suppressed. Examples of a method for putting each resin in a high-temperature and high-pressure state or supercritical state in short time include a method in which the mixed resins are preheated in advance under an ambient pressure environment.

In the method for producing a polymer alloy according to the first aspect of the present invention, a step 3 of cooling the mixture obtained in the step 2 to the glass transition temperature or less rapidly without releasing the pressure of the mixture is carried out.

In the conventional technique, a method for cooling by heat absorption due to adiabatic expansion is adopted. However, in this method, it is hard to control pressure and cooling speed varies according to a difference in pressure release condition, arousing a possibility that macro-phase separation is caused. Also, a polymer alloy containing a large number of air bubbles is only obtained. The present inventors have made earnest studies and, as a result, found that if the system temperature is cooled rapidly to the glass transition temperature or less, an optional micro-phase separation structure can be made corresponding to the cooling speed and a polymer alloy containing no air cell is obtained. Although there is no limitation to the cooling speed in relation to the above-mentioned term "cooled rapidly", the rate of a drop in temperature from the production temperature to the glass transition temperature is preferably 25° C./min or more. When the temperature drop rate is less than 25° C./min, there is the case where the resin is deteriorated. The temperature drop rate is more preferably 50° C./min or more. When there are plural glass transition temperatures, the temperature may be cooled rapidly to the glass transition temperature of a resin exhibiting the lowest glass transition temperature or may be cooled rapidly to the glass transition temperature of each resin step by step repeatedly. In this case, an optional phase structure can be formed by changing the cooling rate. For example, in the case where the upper limit critical consolute temperature is higher than the glass transition temperature of a matrix component and the glass transition temperature of the domain component is higher than the glass transition temperature of a matrix component, a polymer alloy having not a perfectly compatible structure but a micro-phase separation structure can be obtained if the resin mixture is maintained at a temperature higher than the glass transition temperature of the matrix component to precipitate the domain component and then cooled quickly.

In the case where the glass transition temperature of the resin is ambient temperature or less, the phase structure can be maintained to some extent if the resin mixture is cooled quickly to at least ambient temperature. The method for producing a polymer alloy comprising at least a step 1 of mixing two or more resins incompatible with each other at ambient temperature and pressure with a solvent being in a liquid or gas state at ambient temperature and pressure, a step 2 of heating and applying pressure to the solvent into a high-temperature and high-pressure fluid or a supercritical fluid and mixing the solvent in this state, and a step 3 of cooling the mixture obtained in the step 2 rapidly to room temperature or less without releasing the pressure of the mixture in this manner is also one of the present invention.

In the method for producing a polymer alloy according to the first aspect of the present invention, the size of the phase separated domain particle of the polymer alloy can be controlled by optionally setting the temperature and pressure in a production container before the start of mixing or in the initial stage of mixing. Also, the polymer alloy can be obtained as a foaming body by regulating the temperature and pressure when the produced polymer alloy is taken out and by choosing a solvent.

In the method for producing a polymer alloy according to the first aspect of the present invention, the solvent is not decomposed even if it is in a liquid state at ambient temperature and pressure, and the produced polymer alloy can be taken out as particles. After the particles are taken out, they are filtered and dried, whereby a polymer alloy can be easily recovered. Also, the collected resin may be molded into an optional shape by various molding methods.

No particular limitation is imposed on the resin to which the method for producing a polymer alloy according to the first aspect of the present invention is preferably applicable. Examples of the applicable resin include a poly(ethylene), poly(propylene), poly(ethylene-co-vinyl acetate), poly(acrylonitrile-co-stylene), ABS resins, that is acrylonitrile-butadiene-styrene, poly(vinyl chloride), acryl resins, methacryl resins, poly(styrene), poly(tetrafluoroethylene), poly(chlorotrifluoroethylene), poly(vinylidene fluoride), poly(ethylene-co-vinyl alcohol), vinylidene chloride resins, chlorinated poly(ethylene), poly(dicyclopentadiene), methylpentene resins, poly(butylene), poly(phenylene ether)s, poly(amide)s, poly(phenylene sulfide)s, poly(ether ether ketone)s, poly(allyl ether ketone)s, poly(amide imide)s, poly(imide)s, poly(ether imide)s, poly(sulfone)s, poly(ether sulfone), norbornene resins, poly(vinyl alcohol), urethane resins, poly(vinyl pyrrolidone), poly(ethoxy ethyl methacrylate), poly(formaldehyde), cellulose diacetate, poly(vinyl butyral), and like. Particularly, it has been hard to prepare a polymer alloy by using a combination of resins largely differing in polarity. On the contrary, the method for producing a polymer alloy according to the first aspect of the present invention makes it possible to obtain a polymer alloy with ease by using such a combination. Examples of the above-mentioned combination of resins differing in polarity include the cases where the resin having low polarity is a polyolefin resin and the polar resin is an acryl resin, styrene resin, fluorine resin, poly(ether ether ketone)s, poly(carbonate) or the like.

Unlike conventional methods, the method for producing a polymer alloy according to the first aspect of the present invention does not involve the step of vaporizing a liquid solvent quickly at ambient temperature and pressure. Therefore, it is unnecessary to control pressure, showing that this method has high productivity, limits the generation of air bubbles, improving the quality and enables scale-up with ease.

In the method for producing a polymer alloy according to the first aspect of the present invention, a polymer alloy whose phase structure is scarcely broken even by heating can be obtained. Therefore, it is possible to develop the qualities of other resins without damaging the excellent qualities of each resin. Also, because the phase structure of a polymer alloy can be maintained during melt-molding, an excellent molded article can be obtained.

FIG. 1 shows one example of a production apparatus used in the method for producing a polymer alloy according to the first aspect of the present invention. In the production apparatus shown in FIG. 1, a production container 1 is sunk in a metal salt 3. The metal salt 3 is melted under heating by a heater 2 and its temperature is controlled by a thermocouple 4.

It is to be noted that in the production apparatus shown in FIG. 1, a metal salt molten bath is used as heating means. Besides the molten bath, heating means such as an electric heater, a burner, combustion gas, steam, heating medium and sand bath may be used.

The production container 1 is also used for production in severe conditions extending to supercritical range or the vicinity of supercritical range and one made of a material and having a thickness capable of standing against these conditions is therefore used as the production container 1. Examples of a material of the production container 1 include carbon steel, special steel such as Ni, Cr, V or Mo steel, austenite type stainless steel, hastelloy and titanium, or those obtained by lining these materials with glass, ceramic, carbide or the like or those obtained by cladding these materials with other metals.

Also, no particular limitation is imposed on the shape of the production container 1 and, for example, a vessel type, tube type or containers having a specific shape may be used. In particular, a vessel type or tube type is preferable in consideration of heat resistance and pressure resistance. In the case of a batch system, an autoclave and a tubular reactive tube is preferable.

It is preferable to place a hard ball or obstacle having a predetermined shape which is made of a metal, ceramic or the like in the production container 1 to cause a turbulent flow. If the hard ball is provided in the production container 1, a turbulent flow occurs by means of shaking, which improves stirring efficiency, whereby reaction efficiency can be heightened. Further, if the production container 1 is packed with hard balls, this is preferable because stirring efficiency is heightened only by shaking the container.

The packing ratio of the hard ball is preferably 20 to 80%. When the packing ratio is out of this range, stirring efficiency is lowered. In this case, it is preferable to use two or more types of hard balls having different diameters. This can improve the packing ratio and the stirring efficiency.

It is also preferable to provide the production container 1 with a plate through which orifices are opened. If the production container 1 is provided with the plate through which orifices are opened, stirring efficiency is improved and hence reaction efficiency is improved since a turbulent flow is caused by means of shaking.

As examples of the method for producing a polymer alloy according to the present invention by using the production apparatus shown in FIG. 1, the following method is given. Specifically, two or more resins incompatible with each other and a solvent are poured into a production apparatus 1, which is then perfectly sealed and then poured into the above-mentioned metal salt molten bath 5 to heat and pressurize the above-mentioned solvent into a high-temperature and high-pressure fluid or supercritical fluid.

The system is maintained in this condition for a predetermined time to make these two or more resins compatible. Then, the production container 1 is poured into a cooling bath quickly to cool it rapidly. After the container 1 is cooled sufficiently, a polymer alloy produced in the production container 1 is taken out.

FIG. 2 shows another example of a production apparatus used in the method for producing a polymer alloy according to the first aspect of the present invention. In the production apparatus shown in FIG. 2, raw resins are supplied from an extruder 6 and a syringe feeder 7, respectively. The supplied resins are heated and melted by a sheath heater 8. On the other hand, a fluid which can be made into a high-temperature and high-pressure fluid or a supercritical fluid is fed by a quantitative pump 9 to a metal salt molten bath 10, where it is heated. The heated fluid becomes a high-temperature and high-pressure fluid or a supercritical fluid. The mixed resins in a molten state are mixed with the high-temperature fluid and is then kept at a fixed temperature in an electric furnace 11. Then, the mixed resins are changed to a polymer alloy before they reach a cooler 12. The fluid cooled in the cooler 12 is neither a high-temperature and high-pressure fluid nor a supercritical fluid. The resulting polymer alloy is reserved together with the fluid in a recovery tank 14 provided with a back pressure regulating valve 13.

A second aspect of the present invention is directed to a polymer alloy being obtainable by mixing two or more resins incompatible with each other at ambient temperature and pressure in a high-temperature and high-pressure fluid or a supercritical fluid, wherein, at least, when a phase transition phenomenon is observed by using a differential calorimeter, the phase transition phenomenon of any resin among said two or more resins disappears or the phase transition phenomenon is observed at a temperature differing from the temperatures occurring the phase transition phenomenon of each resin.

The polymer alloy of the second aspect of the present invention is obtainable by mixing two or more resins incompatible with each other at ambient temperature and pressure in a high-temperature and high-pressure fluid or a supercritical fluid.

Even in the case of two or more resins incompatible with each other at ambient temperature and pressure conditions, a polymer alloy can be obtained by mixing these resins in a high-temperature and high-pressure fluid or a supercritical fluid.

The polymer alloy of the present invention has the characteristics that when a phase transition phenomenon is measured using a differential calorimeter, at least the phase transition phenomenon of any resin among the above-mentioned two or more resins disappears or a phase transition phenomenon is observed at a temperature differing from the temperatures occurring the phase transition phenomenon of each resin. This shows that the polymer alloy has a ultra-micro-phase separation structure.

Usually, whether a polymer alloy has a ultra-micro-phase separation structure or not is confirmed by dying it by using ruthenium tetraoxide or the like to observe it by using an electron microscope. If the polymer alloy has a ultra-micro-phase separation structure, it can be observed that the polymer alloy is put in a mixed state in which each resin is dispersed uniformly as a small resin domain. However, there is the case where two or more resins are observed in the state that they are completely dissolved mutually and each resin domain is not observed by an electron microscope depending on the type of resin. In this case, whether or not the polymer alloy has a ultra-micro-phase separation structure can be confirmed by measuring the phase transition temperature of each resin in advance by using a differential calorimeter and then by measuring the phase transition temperature of the polymer alloy obtained using these resins. Specifically, in the case where these resins are completely dissolved mutually or are in a dispersed state in which each resin is in a uniformly dispersed and mixed state as a very small resin domain, the phase transition temperature is a single one. It may be therefore inferred that a polymer alloy is formed if the phase transition phenomenon of any one of the resins which phenomenon has been observed until that time disappears and is hence not observed when the polymer alloy reaches the phase transition temperature of that resin or new phase transition temperature at which a phase transition phenomenon newly occurs is observed at temperatures differing from the phase transition temperature of each resin which is observed before.

Also, the size of the above-mentioned resin domain may be calculated by the Zimm's equation given by the following formula after a polymer alloy is molded into a film which is then subjected to measurement using laser light scattering to measure the scattering vector dependency of the scattering strength.

$$1/I(s) \approx 1/<Mw> \cdot [1+(s^2/3) \cdot <Rg>_z]$$

Incidentally, $s = 4\pi \sin\theta/\lambda$.

In the formula, $2\theta$ represents a scattering angle, $\lambda$ represents the wavelength of a power source, $<Rg>_z$ represents the size of a domain observed and $I(s)$ represents a scattering strength for a scattering vector s.

Also, the size of the above-mentioned resin domain may be found in the following manner. Specifically, a polymer alloy is subjected to small angle X-ray scattering measurement to measure the angle dependency of diffraction strength to calculate the size by the Guinier's equation given by the following formula.

$$\ln(I(s)) \approx \ln(I(0)) - s^2 \cdot Rg^2/3$$

In the formula, Rg represents a domain size and I(0) represents a scattering strength at a scattering angle of 0.

With regard to the polymer alloy of the present invention, when highest and lowest temperatures among the glass transition temperatures of two or more resins incompatible with each other at ambient temperature and pressure are $Tg_H$ and $Tg_L$, respectively, and an absolute difference between $Tg_H$ and $Tg_L$ is $\alpha$, the glass transition temperature Tg is preferably in the range of $Tg' \pm 0.1\alpha$ for Tg' calculated by the following equation (1).

$$\Sigma(w_i/Tg_i) = 1/Tg' \qquad (1)$$

In the formula, $w_i$ represents the weight percentage of a resin i and $Tg_i$ represents the glass transition temperature of a resin i. It is preferable.

The above-mentioned formula (1) is called Fox's equation and Tg' calculated by this equation is theoretical glass transition temperature when a polymer alloy has a complete compatible body structure. If the glass transition temperature Tg of a polymer alloy falls in the range of Tg'±0.1α when the polymer alloy is observed using a differential calorimeter, the polymer alloy is considered to have a ultra-micro-phase separation structure.

The polymer alloy according to the present invention preferably has the characteristics that a variation in the glass transition temperature of the polymer alloy when the polymer alloy is processed in a heat cycle including the requirement for the condition that it is heated to at least its glass transition temperature or more is preferably within 0.3α. Usually, when two or more resins incompatible with each other are mixed with each other by using mechanical shearing force such as kneading and then cooled quickly or when each resin is dissolved in a proper solvent without pressurizing it and then cooled quickly, the domain structure is very unstable to heat even if the domain structure is fixed, with the result that the glass transition temperature is changed by applying a heat cycle at the glass transition temperature or more (Polym. Eng. Sci. vol 27, 1953 (1987)). Therefore, if the polymer alloy has such characteristics, the physical properties of the polymer alloy are changed when the polymer alloy is molded so that the original characteristics of the polymer alloy are lost. The variation is more preferably within 0.25α.

No particular limitation is imposed on the resins used in the polymer alloy in the present invention insofar as they are incompatible with each other or have poor compatibility with each other. Examples of combinations of these resins include resin mixtures of crystal resins and amorphous resins; ionic resin mixtures of cationic or anionic resins having poor compatibility with each other; resin mixtures of non-polar resins and polar resins; mixtures of resins differing largely in glass transition temperature or melting point from each other and mixtures of resins largely differing in viscosity from each other. Also, each structure of the above-mentioned resins may be either a linear or branched structure or the resin may have a crosslinking structure. Moreover, the regularity of these resins may be isotactic, syndiotactic or atactic. Also, the above-mentioned resins may be copolymers such as block copolymers, random copolymers and graft copolymers. Also, the resins may be oligomers or high-molecular or ultra-high molecular polymers.

In the case of aiming at optical applications, the above-mentioned resins preferably have high transparency. There is no particular limitation to the highly transparent resin. Examples of the resin include thermoplastic norbornene resins, methyl poly(methacrylate), poly(styrene), poly(carbonate), polyesters and the like. Also, when the resins have refractive indexes close to each other, this is preferable because it is easy to obtain transparency. Also, there are applications needing a low refractive index and resins having a low refractive index such as thermoplastic norbornene resins, methyl poly(methacrylate) and poly(styrene) are preferable in such optical applications.

The polymer alloy obtained with an aim at optical applications is superior in transparency, heat resistance, hygroscopicity, low birefringent properties and moldability. Therefore, the polymer alloy of the present invention, making use its characteristics, can be widely used in various applications including optical applications such as lenses, e.g., lenses for general cameras, lenses for video cameras, telescope lenses, spectacle lenses and lenses for laser beams, optical disks, e.g., optical videodisks, audiodisks, document file disks and memory disks, optical materials, e.g., optical fibers, image receiving transfer sheets and various films and sheets and packages for various electronic devices, window glasses, print boards, sealing materials and binders for inorganic or organic compounds.

When the polymer alloy of the present invention contains a thermoplastic norbornene resin, the moldability, moisture permeability, adhesiveness and the like are improved without impairing the heat resistance and transparency of the thermoplastic norbornene resin. Also, thermal deterioration and the occurrence of defects during melt-molding can be suppressed.

No particular limitation is imposed on the thermoplastic norbornene resin. Examples of the thermoplastic norbornene resin may include hydrogenated products of ring-opened polymers (including copolymers) of norbornene monomers; and copolymers of norbornene monomers and olefinic monomers such as ethylene and/or α-olefin. These resins have substantially no unsaturated bond.

As the norbornene monomer which is to be a raw material for the thermoplastic norbornene resin, those described in Japanese Kokai Publication Hei-5-39403, Japanese Kokai Publication Hei-5-212828 and Japanese Patent No. 3038825, 3019741 and 3030953 may be used. Examples of these monomers may include norbornene, methanooctahydronaphthalene, dimethanooctahydronaphthalene, dimethanododecahydroanthracene, dimethanodecahydroanthracene and trimethanododecahydroanthracene or their substitution products; dicyclopentadiene, 2,3-dihydrocyclopentadiene, methanooctahydrobenzoindene, dimethanooctahydrobenzoindene, methanodecahydrobenzoindene, dimethanodecahydrobenzoindene, methanooctahydrofluorene and dimethanooctahydrofluorene or their substitution products. These norbornene monomers may be used either singly or in combinations of two or more.

No particular limitation is imposed on the substituent in the above-mentioned substitution products and conventionally known hydrocarbon groups or polar groups may be used as the substituent. Examples of the substituent include an alkyl group, alkylidene group, aryl group, cyano group, halogen atom, alkoxycarbonyl group, pyridyl group and the like. Examples of the substitution product include 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene and the like.

The number average molecular weight of the above-mentioned thermoplastic norbornene resin is usually preferably 5000 to 200000 though no particular limitation is imposed on it. When the number average molecular weight is less than 5000, there is the case where the mechanical strength of a molded product (especially, optical films) produced from the polymer alloy of the present invention is insufficient whereas when the number average molecular weight is more than 200000, there is the case where the moldability is impaired. The number average molecular weight is more preferably 7000 to 35000, still more preferably 8000 to 30000. The number average molecular weight of the above-mentioned thermoplastic norbornene resin may be measured by gel permeation chromatography (GPC).

The thermoplastic norbornene resin used in the present invention may be either a resin having a polar group or a resin having no polar group. In the case of the thermoplastic norbornene resin having a polar group, the polar group may exist to the extent that the optical characteristics and moldability are not impaired and the presence of the polar group is rather preferable to impart proper moisture permeability to a molded article.

There is no particular limitation to the polar group like this. Examples of the polar group include a halogen group (chlorine group, bromine group and fluorine group), hydroxyl group, carboxylic acid group, ester group, amino group, acid anhydride group, cyano group, silyl group, epoxy group, acryl group, methacryl group, silanol group and the like. In particular, an ester group and acid anhydride group which can provide reactivity by deprotection are preferable.

Examples of the thermoplastic norbornene resin available as commercial products among the above-mentioned thermoplastic norbornene resins include "Arton" (manufactured by JSR Corporation) as resins having a polar group and "Zeonor" (manufactured by Zeon Corporation) as resins having no polar group.

In the case of using the above-mentioned thermoplastic norbornene resin in the polymer alloy of the present invention, no particular limitation is imposed on the incompatible resin used in combination with the thermoplastic norbornene resin to form the polymer alloy. Examples of the incompatible resin include poly(ethylene), poly(propylene), poly(ethylene-co-α-olefin)s; poly(ethylene-co-vinyl acetate); poly (ethylene-co-(meth)acrylate) or poly(ethylene-co-(meth) acrylic acid) such as poly(ethylene-co-ethylacrylate); polyolefin resins such as poly(butadiene); poly((meth)acrylate ester) such as methyl poly(methacrylate) and butyl poly(acrylate); poly(carbonate); poly(vinyl acetate); poly (amide)s; poly(acetal)s; poly(phenylene ether)s; ionomers; poly(vinyl chloride); poly(imide)s; poly(ester)s; poly(ethylene oxide); poly(arylate); ABS resins; plastic fluorides; poly(vinylidene fluoride); poly(vinylidene chloride); poly (styrene); poly(sulfone)s; poly(vinyl ether)s; poly(vinyl alcohol); and poly(lactate). In particular, non-crystalline resins or less-crystalline resins such as methyl poly(methacrylate), poly(carbonate), poly(sulfone)s, triacetyl celluloses- and poly(vinyl alcohol) or resins having a small crystal size though they are crystalline resins are preferably used for an optical film which needs transparency.

When at least one of the above-mentioned two or more resins used in the polymer alloy of the present invention is a transparent resin, the above-mentioned transparent resin and the resin incompatible with the transparent resin preferably form a ultra-micro-separation structure 100 nm or less in size. When the phase separation structure is more than 100 nm, transparency, haze and the like are reduced and there is therefore the possibility of the obtained polymer alloy being unfit for optical uses. It is also possible to impart moisture permeability to the thermoplastic norbornene resin by mixing a resin having high moisture permeability to make a ultra-micro-separation structure 100 nm or less in size.

As to the compounding ratio of the above-mentioned two or more resins incompatible with each other at ambient temperature and pressure conditions in the polymer alloy of the present invention, the resin incompatible with the above-mentioned base resin is compounded in an amount of preferably 0.01 to 100 parts by weight based on 100 parts by weight of the base resin. The ratio is more preferably 0.01 to 15 parts by weight, still more preferably 3 to 10 parts by weight.

Also, in the case of using the thermoplastic norbornene resin, when the compounding amount of the incompatible resin used to form the polymer alloy in combination with the thermoplastic norbornene resin is defined based on another standard, the amount preferably falls within a range where a reduction in temperature caused by compounding the above-mentioned thermoplastic norbornene resin can be kept within 30° C. in order to maintain the heat resistance and moldability of the resulting polymer alloy. When the reduction in glass transition temperature is more than 30° C., the heat resistance which the thermoplastic norbornene resin originally has is impaired and there is therefore the case where the range of use is largely limited in applications such as optical films.

Known additives such as an antioxidant, ultraviolet absorber, lubricant and antistatic agent may be compounded in the polymer alloy of the present invention to the extent that the object of the present invention is not impaired.

Examples of the antioxidant include 2,6-di-t-butyl-4-methylphenol, 2,2'-dioxy-3,3'-di-t-butyl-5,5'-dimethyldiphenylmethane, tetrakis[methylene-3-(3,5-di-t-butyl-4-hydroxyphenyl)propionate]methane, and the like. Examples of the ultraviolet absorber include 2,4-dihydroxybenzophenone, 2-hydroxy-4-methoxybenzophenone, and the like.

When the polymer alloy of the second aspect of the present invention contains the above-mentioned thermoplastic norbornene resin, the polymer alloy is superior in transparency, heat resistance, low hygroscopicity, low birefringent properties and moldability. Therefore, the polymer alloy, making use its characteristics, can be widely used in various applications including optical applications such as lenses, e.g., lenses for general cameras, lenses for video cameras, telescope lenses, spectacle lenses and lenses for laser beams, optical disks, e.g., optical videodisks, audio-disks, document file disks and memory disks, optical materials, e.g., optical fibers, image receiving transfer sheets and various films and sheets and packages for various electronic devices, window glasses, print boards, sealing materials and binders for inorganic or organic compounds.

A molded article and a transparent molded article being obtainable by using the polymer alloy of the present invention are also respectively one of the present invention.

The molded article being obtainable by using the polymer alloy of the present invention may be obtainable by using known molding means, for example, extrusion molding, injection molding, compression molding, blow molding and calender molding.

Although no particular limitation is imposed on a method for producing the molded article obtained using the polymer alloy of the present invention, it is preferable to mold the polymer alloy at temperatures higher than the phase transition initiation temperature of the polymer alloy ultra-micro-phase separation structure which temperature is found by a differential calorimeter. However, the polymer alloy is preferably molded at temperatures not higher than the phase transition initiation temperature by 30° C. or more. If the temperature is too high, there is a possibility that the ultra-micro-phase separation structure is broken during molding. It is to be noted that the polymer alloy may be subjected to injection molding or extrusion molding directly from the supercritical state or high-temperature and high-pressure state.

Also, when the polymer alloy is molded into an optical film, it is preferably heat-pressed at temperatures not higher than the phase transition initiation temperature by 30° C. or more. It is more preferably heat-pressed at temperatures not higher by 30° C. or more than the glass transition temperature of the resin compounded in the highest compounding ratio. This ensures that even in the case where the polymer alloy foams or in the case where the polymer alloy does not foam but embraces a few air bubbles, a transparent optical film with no air bubbles present in the inside thereof can be obtained without breaking the ultra-micro-phase structure. Also, if heating is continued for a long time even though the molding temperature is not high, the ultra-micro-phase separation structure is gradually lost and it is therefore preferable to make the molding time as short as possible.

In addition, a hardcoat layer containing an inorganic compound, organic silicon compound such as a silane coupling agent, acryl type resin, vinyl type resin, melanin resin, epoxy resin, fluorine type resin, silicone resin or the like may be formed on the surface of the molded article being obtainable by using the polymer alloy of the present invention. This makes it possible to improve the heat resistance, optical characteristics, chemical resistance, abrasive resistance, moisture permeability and the like of the molded article.

Examples of means for forming the hardcoat layer may include known methods such as a heat-curing method, ultraviolet ray-curing method, vacuum deposition method, sputtering method and ion plating method.

When the polymer alloy of the present invention contains the thermoplastic norbornene resin as its structural component, it is preferably applicable to optical films, such as particularly, phase difference films and polarizing plate protective films by maximally making use of the point that it is superior in moldability and heat resistance.

An optical film obtained using the polymer alloy of the present invention is also one of the present invention.

The optical film of the present invention preferably has a tearing strength of 0.1 N or more. If the tearing strength is less than 0.1 N, there is the case where the range of applications as optical films is limited and this tendency is significant in the case of, particularly, a thin film having a thickness of 10 μm or less.

The optical film of the present invention preferably has a total light transmittance of 60% or more. When the transmittance is less than 60%, there is the case where the range of applications as optical films is limited. The transmittance is preferably 70% or more, more preferably 80% or more.

The optical film of the present invention preferably a haze of 20% or less. When the haze is less than 20%, there is the case where the range of applications as optical films is limited. The haze is more preferably 10% or less, still more preferably 5% or less.

The optical film of the present invention may be obtainable by, for example, an extrusion molding method, press molding method or the like. The thickness of the optical film of the present invention is usually 10 to 300 μm.

The polymer alloy of the present invention ensures that the qualities of other resins can also be developed without impairing the excellent qualities of each resin. Also, the phase separation structure is scarcely broken even by heating, so that the micro-phase separation structure of the polymer alloy is maintained during melt-molding. It is therefore possible to obtain an excellent molded article.

BEST MODE FOR CARRYING OUT THE INVENTION

The present invention will be described in more detail by way of examples, which, however, are not intended to be limiting of the present invention.

EXAMPLES 1, 2, 4, 5 AND 6

A batch type production container 1 (tube type container, made of SUS316, Tube Bomb Reactor, internal volume: 100 mL) shown in FIG. 1 was charged with a solvent, a thermoplastic norbornene resin (Tg=161° C.), a methyl poly (methacrylate) resin (PMMA, Tg=110° C.), a poly(carbonate) (PC, Tg=141° C.) and an poly(ethylene-co-vinyl acetate) (EVA, $T_m$=78° C.) in each predetermined amount according to the formulation shown in Table 1 and the atmosphere in the production container was completely replaced with nitrogen.

Next, the production container 1 was sunk in a metal salt molten bath 5 (manufactured by Shin-Nippo Chemical Co., Ltd.) equipped with a micro-heater 2 (manufactured by Sukegawa Electric Co., Ltd.) and treated in the condition of the temperature and pressure shown in Table 1 for a predetermined time. Then, the production container 1 was cooled rapidly in a cooled bath and then ice-cooled and the obtained polymer alloy was separated and dried.

The obtained polymer alloy was heat-pressed at 185° C. to manufacture a film 40 μm in thickness.

EXAMPLE 3

A batch type production container 1 (tube type container, made of SUS316, Tube Bomb Reactor, internal volume: 100 mL) shown in FIG. 1 was charged with a thermoplastic norbornene resin and a PMMA in each predetermined amount according to the formulation shown in Table 1. Then, carbon dioxide was liquefied and then added in the production container until the pressure in the container was 10 MPa and the container was sealed. Thereafter, the production container 1 was sunk in a metal salt molten bath 5 (manufactured by Shin-Nippo Chemical Co., Ltd.) equipped with a micro-heater 2 (manufactured by Sukegawa Electric Co., Ltd.) to heat the production container 1 quickly, thereby raising the temperature and pressure in the container to 200° C. and 35 MPa, respectively. This condition was kept for 180 minutes. After that, the production container 1 was cooled in air and the obtained polymer alloy was then dried.

The obtained polymer alloy was heat-pressed at 185° C. to manufacture a film 40 μm in thickness.

COMPARATIVE EXAMPLES 1 TO 3

A thermoplastic norbornene resin, a PMMA, a PC and an EVA were mixed in each predetermined amount according to the formulation shown in Table 1 and kneaded in a predetermined condition by a plastomill (LABO PLASTOMILL MODEL 100C100, manufactured by Toyo Seiki Kogyo, Ltd.) to obtain a polymer blend.

The obtained polymer blend was heat-pressed at 185° C. to manufacture a film 40 μm in thickness.

With regard to the polymer alloys obtained in Examples 1 to 6 and the polymer blends obtained in Comparative Examples 1 to 3, the phase transition temperature and the size of the phase separation structure were evaluated according to the following methods. Also, with regard to the films manufactured in Examples 1 to 6 and in Comparative Examples 1 to 3, the total light transmittance was evaluated according to the following method.

The results are shown in Table 1.

[Phase Transition Temperature]

The glass transition temperature when the temperature was finally raised in a temperature condition program carried in the order of the following (1) to (6) by using DSC2920 Modulated DSC manufactured by TA Instruments was defined as the glass transition temperature used in the present invention.

(1) The temperature is dropped at a rate of 10° C./min from ambient temperature to −50° C. and maintained at −50° C. for 5 minutes.

(2) The temperature is raised at a rate of 10° C./min from −50° C. to 280° C. and maintained at 280° C. for 5 minutes.

(3) The temperature is dropped at a rate of 10° C./min from 280° C. to −50° C. and maintained at −50° C. for 5 minutes.

(4) The temperature is raised at a rate of 10° C./min from −50° C. to 280° C. and maintained at 280° C. for 5 minutes.

The condition of the measurement of phase transition temperature corresponds to that of a heat cycle test for the polymer alloy to be measured. Accordingly, the case where a variation between the phase transition temperature measured without running any heat cycle and the phase transition temperature measured when the heat cycle was repeated three times under the above-mentioned measuring condition of phase transition temperature was 0.5α or less was defined as ○ and the case where the above-mentioned variation exceeded 0.5α was defined as X to evaluate each sample.

[Size of the Phase Separation Structure]

The phase separation structure was observed using a transmission type electron microscope and evaluated according to the following standard.

○: 100 nm or less.
X: More than 100 nm.

[Total Light Transmittance]

A haze meter (HCIIIDPK, manufactured by Tokyo Denshoku Co., Ltd.) was used to measure the total light transmittance according to JIS K 7150.

INDUSTRIAL APPLICABILITY

According to the present invention, a polymer alloy, a method for producing the polymer alloy and a molded product and an optical film which is obtainable by using a polymer alloy can be provided.

The invention claimed is:

1. A method for producing a polymer alloy containing no air bubbles,
   which comprises at least:
   a step 1 of mixing two or more resins incompatible with each other at ambient temperature and pressure with a solvent being in a liquid or gas state at ambient temperature and pressure;
   a step 2 of heating and applying pressure to said solvent into a high-temperature and high-pressure fluid or a supercritical fluid and mixing the solvent in this state; and,
   a step 3 of cooling the mixture obtained in said step 2 rapidly to the glass transition temperature or less without releasing the pressure of the mixture.

2. A method for producing a polymer alloy containing no air bubbles,
   which comprises at least:
   a step 1 of mixing two or more resins incompatible with each other at ambient temperature and pressure with a solvent being in a liquid or gas state at ambient temperature and pressure;

TABLE 1

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Material (parts by weight) | | | | | | | | | |
| Solvent | $H_2O$ | MeOH | $CO_2$ | $H_2O$ | $H_2O$ | $H_2O$ | None | None | None |
|  | 38 | 38 | — | 38 | 38 | 38 | — | — | — |
| Thermoplastic resin norbornane resin | 4 | 4 | 4 | 4 | 4.5 | 4 | 40 | 40 | 40 |
| PMMA | 1 | 1 | 1 | — | — | — | 10 | — | — |
| PC | — | — | — | 1 | 0.5 | — | — | 10 | — |
| EVA | — | — | — | — | — | 1 | — | — | 10 |
| Condition | | | | | | | | | |
| Mixing temperature (° C.) | 400 | 300 | 200 | 400 | 400 | 400 | 230 | 230 | 230 |
| Mixing pressure (MPa) | 30 | 35 | 35 | 30 | 30 | 30 | 0.1 | 0.1 | 0.1 |
| Mixing time (minute) | 5 | 5 | 180 | 5 | 5 | 5 | 15 | 15 | 15 |
| Results of evaluation | | | | | | | | | |
| Glass transition temperature (° C.) | 149 | 150 | 161 | 155 | 158 | 96 | 108 | 141 | 78 |
| Melting point (° C.) | | | | | | 161 | 161 | 161 | 161 |
| Variation in phase transition temperature | ○ | ○ | ○ | ○ | ○ | x | x | x | x |
| Size of phase separation structure | ○ | ○ | x | ○ | ○ | ○ | x | x | x |
| Total light transmittance (%) | 90 | 88 | 62 | 89 | 91 | 70 | 56 | 59 | 32 |

As is clear from Table 1, the films of Examples 1, 2, 4 and 5 using the polymer alloy containing a thermoplastic norbornene resin had high transparency.

a step 2 of heating and applying pressure to said solvent into a high-temperature and high-pressure fluid or a supercritical fluid and mixing the solvent in this state; and, a step 3 of cooling the mixture obtained in said step 2 rapidly to ambient temperature or less without releasing the pressure of the mixture.

3. The method for producing a polymer alloy according to claim 1,
wherein the volume of the solvent in the mixture of the two or more resins incompatible with each other at ambient temperature and pressure and the solvent being in a liquid state at ambient temperature and pressure is equal to or more than the total volume of said two or more resins incompatible with each other at ambient temperature and pressure.

4. The method for producing a polymer alloy according to claim 1,
wherein the two or more resins incompatible with each other at ambient temperature and pressure are a thermoplastic norbornene resin and one or more resins incompatible with the thermoplastic norbornene resin.

5. A polymer alloy being obtained by the method for producing a polymer alloy according to claim 1,
wherein, at least, when a phase transition phenomenon is observed by using a differential calorimeter, the phase transition phenomenon of any resin among said two or more resins disappears or the phase transition phenomenon is observed at a temperature differing from the temperatures occurring the phase transition phenomenon of each resin.

6. The polymer alloy according to claim 5,
wherein when the highest and lowest temperatures among the glass transition temperatures of two or more resins incompatible with each other at ambient temperature and pressure are $Tg_H$ and $Tg_L$, respectively, and an absolute difference between $Tg_H$ and $Tg_L$ is α, a glass transition temperature Tg of the polymer alloy is in the range of Tg' ±0.1 α for Tg' calculated by the following equation (1):

$$\Sigma(w_i/Tg_i)=1/Tg' \qquad (1)$$

in the formula, $w_i$ represents the weight percentage of a resin i and $Tg_i$ represents the glass transition temperature of a resin i.

7. The polymer alloy according to claim 5,
wherein when the highest and lowest temperatures among the glass transition temperatures of two or more resins incompatible with each other at ambient temperature and pressure are $Tg_H$ and $Tg_L$, respectively, and an absolute difference between $Tg_H$ and $Tg_L$ is α, a variation in the glass transition temperature of the polymer alloy is within 0.3 in the case of processing the polymer alloy in a heat cycle including the requirement for the condition heated to at least its glass transition temperature or more.

8. The polymer alloy according to claim 5,
wherein said polymer alloy comprises a transparent resin and at least one or more resins incompatible with the transparent resin and,
said transparent resin and the resins incompatible with the transparent resin form a ultra-micro-phase separation structure 100 nm or less in size.

9. A molded article,
which is obtained by molding the polymer alloy according to claim 5.

10. A transparent molded article,
which is obtained by melt-molding the polymer alloy according to claim 5.

11. A method for producing a molded article according to claim 9,
which comprises molding at a temperature higher than the phase transition initiation temperature of the polymer alloy ultra-micro-phase separation structure found by a differential calorimeter.

12. An optical film,
which is obtained by using the polymer alloy according to claim 5.

13. The method for producing a polymer alloy according to claim 2,
wherein the volume of the solvent in the mixture of the two or more resins incompatible with each other at ambient temperature and pressure and the solvent being in a liquid state at ambient temperature and pressure is equal to or more than the total volume of said two or more resins incompatible with each other at ambient temperature and pressure.

14. The method for producing a polymer alloy according to claim 2,
wherein the two or more resins incompatible with each other at ambient temperature and pressure are a thermoplastic norbornene resin and one or more resins incompatible with the thermoplastic norbornene resin.

15. The method for producing a polymer alloy according to claim 3,
wherein the two or more resins incompatible with each other at ambient temperature and pressure are a thermoplastic norbornene resin and one or more resins incompatible with the thermoplastic norbornene resin.

16. The polymer alloy according to claim 6,
wherein when the highest and lowest temperatures among the glass transition temperatures of two or more resins incompatible with each other at ambient temperature and pressure are $Tg_H$ and $Tg_L$, respectively, and an absolute difference between $Tg_H$ and $Tg_L$ is α, a variation in the glass transition temperature of the polymer alloy is within 0.3 in the case of processing the polymer alloy in a heat cycle including the requirement for the condition heated to at least its glass transition temperature or more.

17. The polymer alloy according to claim 6,
wherein said polymer alloy comprises a transparent resin and at least one or more resins incompatible with the transparent resin and,
said transparent resin and the resins incompatible with the transparent resin form a ultra-micro-phase separation structure 100 nm or less in size.

18. The polymer alloy according to claim 7,
wherein said polymer alloy comprises a transparent resin and at least one or more resins incompatible with the transparent resin and,
said transparent resin and the resins incompatible with the transparent resin form a ultra-micro-phase separation structure 100 nm or less in size.

19. A molded article, which is obtained by molding the polymer alloy according to claim 6.

20. A method for producing a molded article according to claim 10,
which comprises molding at a temperature higher than the phase transition initiation temperature of the polymer alloy ultra-micro-phase separation structure found by a differential calorimeter.

* * * * *